United States Patent [19]

Aoyama et al.

[11] Patent Number: 4,974,145
[45] Date of Patent: Nov. 27, 1990

[54] PROCESSOR SYSTEM INCLUDING A PAGING PROCESSOR FOR CONTROLLING PAGING BETWEEN A MAIN STORAGE AND AN EXTENDED STORAGE

[75] Inventors: Tomoo Aoyama; Hiroshi Murayama, both of Hadano, Japan

[73] Assignees: Hitachi, Ltd., Tokyo; Hitachi Computer Engineering Co., Ltd., Kanagawa, both of Japan

[21] Appl. No.: 277,949

[22] Filed: Nov. 30, 1988

[30] Foreign Application Priority Data

Dec. 1, 1987 [JP] Japan ................... 62-301527

[51] Int. Cl.$^5$ ............... G06F 15/16; G06F 12/10; G06F 13/00
[52] U.S. Cl. ................. 364/200; 364/243.41; 364/232.21; 364/256.3
[58] Field of Search ... 364/200 MS File, 900 MS File

[56] References Cited

U.S. PATENT DOCUMENTS

| | | | |
|---|---|---|---|
| 4,186,438 | 1/1980 | Benson et al. | 364/200 |
| 4,612,612 | 9/1986 | Woffinden et al. | 364/200 |
| 4,630,230 | 12/1986 | Sundet | 364/900 |

*Primary Examiner*—David Y. Eng

*Attorney, Agent, or Firm*—Antonelli, Terry, Stout & Kraus

[57] ABSTRACT

A vector processor having a scalar procesing unit, a vector processing unit, a main storage unit, an extended storage unit, a storage control unit, and a paging processor unit, in which the storage control unit address translation for an access request from the vector processing unit to the main storage unit and includes a circuit for storing a kind of an access request issued for each storage location of the main storage the paging processor unit includes a circuit operative in response to issuance of an access request for data in a logical address space not existing in the main storage unit for interrupting a vector access request related thereto from the vector processing unit, a circuit for releasing the interruption according to an instruction, a circuit for loading the main storage unit with requested data of a logical address space existing in the extended storage unit, and a circuit for detecting an area of the main storage having a lower access frequency so as to move data from the area into the extended storage unit. A microprogram is used to execute programming of an algorithm to achieve a data transfer between the main storage unit and the extended storage unit.

9 Claims, 10 Drawing Sheets

ADDRESS GENERATION 23

FIG. 4

RELOCATION TABLE CIRCUIT

FIG. 5

RELOCATION TABLE CIRCUIT 4

PAGING PROCESSING UNIT 7

FIG. 8

LOGIC 409 AND DEC 405

FIG. 9

DECODER 405, 406, 407

FIG. 10

REGISTER MANAGEMENT UNIT 600

FIG. 11

DECODER 511 AND LOGIC 408

PROCESSOR SYSTEM INCLUDING A PAGING PROCESSOR FOR CONTROLLING PAGING BETWEEN A MAIN STORAGE AND AN EXTENDED STORAGE

BACKGROUND OF THE INVENTION

The present invention relates to a vector processor having a paging processor, and in particular, to a vector processor to which an external storage having a large capacity is connected.

DESCRIPTION OF THE RELATED ART

Recently, it has been strongly desired to connect a main storage (MS) having a large capacity to a vector processor. In a vector processor according to the prior art, the storage thereof comprises a static random access memory (SRAM) so as to cope with successive accesses from the vector processor requiring a high-speed response. In consequence, the cost of the main storage of the vector processor is one order higher than that of the general-purpose computer commonly used. Consequently, it is most difficult to to expand the main storage constituted with the SRAM for an expansion of the main storage area because of the limitation of the cost.

On the other hand, a device in which an extended storage (ES) is connected to a vector processor in order to effect the input/output processing of the vector processor at a higher speed has been known as a solid-state device from the specification of the U.S. Pat. No. 4,630,230. In the vector processor according to the prior art technology of this kind, the extended storage comprises a dynamic random access memory (DRAM) as an element thereof, which enables the mounting density of the memory to be four times that of the main storage employing the SRAM and which also lowers the cost of the main storage as compared with that using the SRAM. However, the extended storage is positioned as an external storage, namely, not as a main storage, and as a result an increased wiring length is required between the vector processor and the location thereof. In consequence, according to the prior art mentioned above, in order to match the data transfer between the vector processor and the extended storage with the vector processing speed, it is necessary to configure the system so as to decrease the data transfer pitch and to increase the data transfer width. In the prior art technology, due to such restrictions of the hardware, the data processing unit of the extended storage is at least 100 times that of the main storage; in consequence, it is impossible to apply the instruction format in which a location is directly specified by an instruction to effect a processing. According to the conventional technology, the data in the extended storage is processed in the following processing format, namely, the data is moved to the main storage through a data transfer effected between the extended storage and the main storage such that an operation is effected on the data in the main storage so as to put or to return the result of the operation to the extended storage. The sequence of the operations above are accomplished by the software, which imposes a load on the user's programming.

In the vector processor of the prior art technology, the extended storage connected thereto is positioned as an external storage, and hence it is impossible to directly specify an arithmetic processing on data in the extended storage by use of a program statement of a program. In consequence, the requirement to increase the capacity of the main storage of the vector processor cannot be fully satisfied by the prior art technology in which the extended storage is connected to the vector processor.

SUMMARY OF THE INVENTION

It is therefore an object of the present invention to provide a low-cost vector processor having an extended storage including a function equivalent to a main storage having a large capacity.

According to a feature of the present invention, in order to achieve the above object, the vector processor comprises six logic units, namely, a scalar processing unit, a vector processor unit, a main storage (MS) unit, an extended storage unit, a storage control unit, and a paging processor, said paging processor having the following functions.

1. A function to store a kind of an access for each configuration unit of the MS unit.
2. A function to interrupt, when an access request is issued to data in a logical address space not existing in the main storage, processing of the vector access request in the vector processing unit.
3. A function to load the main storage with data existing in a logical address space of the extended storage.
4. A function to detect or monitor an area which is less frequently accessed in the main storage.
5. A function to write or to page-out into the extended storage the area less frequently accessed in the main storage.

In a vector processor having the hardware functions indicated above, the paging processor interrupts, when an access request is issued from the vector processing unit to the main storage and data in a logical address space corresponding to the access request does not exist in the main storage, the processing of the vector access request in the vector processing unit such that data of the logical address space which exists in the extended storage and for which the access request is issued is loaded in a predetermined area of the main storage and thereafter the processing of the vector processing unit is resumed. In addition, the paging processor monitors an area less frequently accessed in the main storage so as to detect the area such that a put or write processing is effected to write data from the area into the extended storage, thereby controlling the main storage and the extended storage such that the main storage contains only the data to be frequently accessed in any cases.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Referring now to the drawings, description will be given of an embodiment of a vector processor according to the present invention.

In the drawings, the same reference numerals indicate the same sections or components.

Prior to the description of the embodiment of the vector processor of FIG. 1 according to the present invention, description will be given, for understanding of the concept of the present invention, of the address spaces in the main storage (MS) and the extended storage (ES) to be accessed from the respective logic sections of the vector processor and the operation of the operating system (to be abbreviated as OS herebelow).

Figure 2:
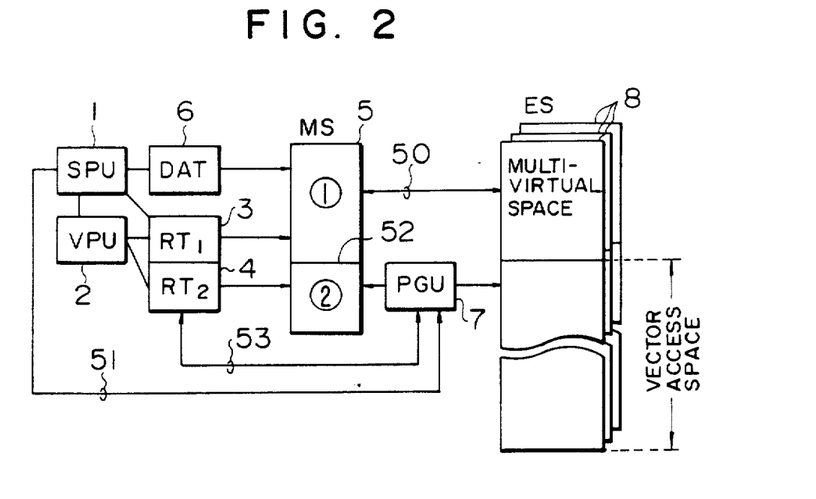
FIG. 2 is a diagram useful to explain the concept of the address space.

In FIG. 2, a scalar processing unit (SPU) 1 initiates the operation of a vector processing unit (VPU) 2 so as to validate relocation tables 3 and 4. The scalar processing unit 1 accesses a main storage 5 via a dynamic address translation unit 6. The main storage 5 represents a real address space, which is subdivided into two kinds of spaces denoted as ① and ②. The real address space ① is subjected to a space management of the operating system and constitutes a multi-virtual space so as to communicate data in a page unit with an extended storage 8 as an external storage. The vector processing unit 2 accesses the multi-virtual space via the relocation table 3. The operation to match the contents of the dynamic address translation unit 6 with those of the relocation table 3 is accomplished by the operating system.

In FIG. 2, the communication between the real address space ① of the main storage 5 and the extended storage 8 as the external storage is indicated by a path 50. The medium of the extended storage 8 as the external storage may comprise a memory device such as a DRAM; furthermore, as an external storage, a magnetic medium such as a disk device may also be employed. The storage or memory space constituted with the extended storage 8 is subdivided into partitions according to the respective jobs, a plurality of partitions configuring an address space.

In the system initialization, the operating system subdivides the extended space into two kinds of spaces including a multi-virtual space and a vector access space. With respect to the real address of the extended storage, both spaces are not subdivided into such two kinds of spaces with an address boundary. However, when viewed as a logical space of the user, the vector access space seems to exist in a space having a higher address as compared with a space of the multi-virtual space.

When the system is initialized, the operating system splits the main storage space into two kinds of spaces including a space to be accessed from the scalar processing unit 1 and the vector processing unit 2 and a space to be accessed only from the vector processing unit 2. In the configuration example of FIG. 2, the real access space of the main storage 5 is subdivided into a space ① to be accessed by the scalar processing unit 1 and the vector processing unit 2 and a space ② to be accessed only by the vector processing unit 2. Although these spaces are separated with an address boundary 52, the space subdivision need not be necessarily effected in this fashion.

The vector processing unit 2 accesses the address space ② in the main storage 5 via the relocation table $RT_2$ 4, which enables an access thereto even when there does not exist a sufficient space for the operation of the vector processing unit 2. In this case, the relocation table $RT_2$ 4 is loaded with information indicating a space not actually existing in the main storage 5. When the vector processing unit 2 attempts to access an area not present in the main storage 5, the access issue processing of the vector processing unit 2 is interrupted so as to start a paging processor 7 via a path 53. The paging processor 7 then writes a portion of the address space ② of the main storage 5 into the vector access space ② of the extended storage 8 so as to transfer to the space of the main storage 5 data of the space corresponding to the access request issued from the vector processor 2. In this situation, the operating system rewrites information in the relocation table $RT_2$ 4, said information indicating an area actually existing in the main storage 5. After the operation above is completed, the paging processor 7 indicates a restart of an access request issuance to the vector processing unit 2.

The operating system allocates the address space of the extended storage 8 to spaces unique to the initial jobs for the job execution. That is, the operating system determines the allocation of positions of the actual extended address space for the respective jobs and decides the size of the vector access space. Next, the operating system generates in the main storage 5 a translation table between the real address space and the request addresses issued from the paging processor 7. The main storage space is unique to the operating system. The translation table is sent from the scalar processing unit 1 effecting the processing of the operating system via a path 51 to the paging processor 7. The translation table further includes additional data of access limitation information, which prevents a user job from accessing another user job area not allocated thereto.

In the initial stage of the job execution, the relocation table $Rt_2$ 4 is initialized by the operating system; however, if an access request is issued from the vector processing unit 2, the relocation table $Rt_2$ 4 is then controlled by the paging processing unit 7.

As described above, in the vector processor according to the present invention, a new hardware system effecting the paging operation is added to the conventional system in which the vector processing unit achieves the processing of the dynamic address translation unit and that of the relocation table by use of the operating system so as to effect the address translation while guaranteeing the matching therebetween, which enables a vector access to be effected to a space with a large capacity exceeding the range associated with the address translation manager of the operating system.

In a task switch in the vector processing unit, it is necessary for the operating system to determine whether or not the scalar processing unit 1 is effecting vector processing for the following reason. Namely, in order for the operating system to effect a matching operation between the dynamic address translation unit of the scalar processing unit and the relocation table for the vector processing, it is necessary to recognize a point of time where the relocation table is to be rewritten.

According to the present invention, by introducing the address translation manager, the vector processing space can be expanded while retaining the upper compatibility of the operating system in the conventional vector processor.

Figure 1:
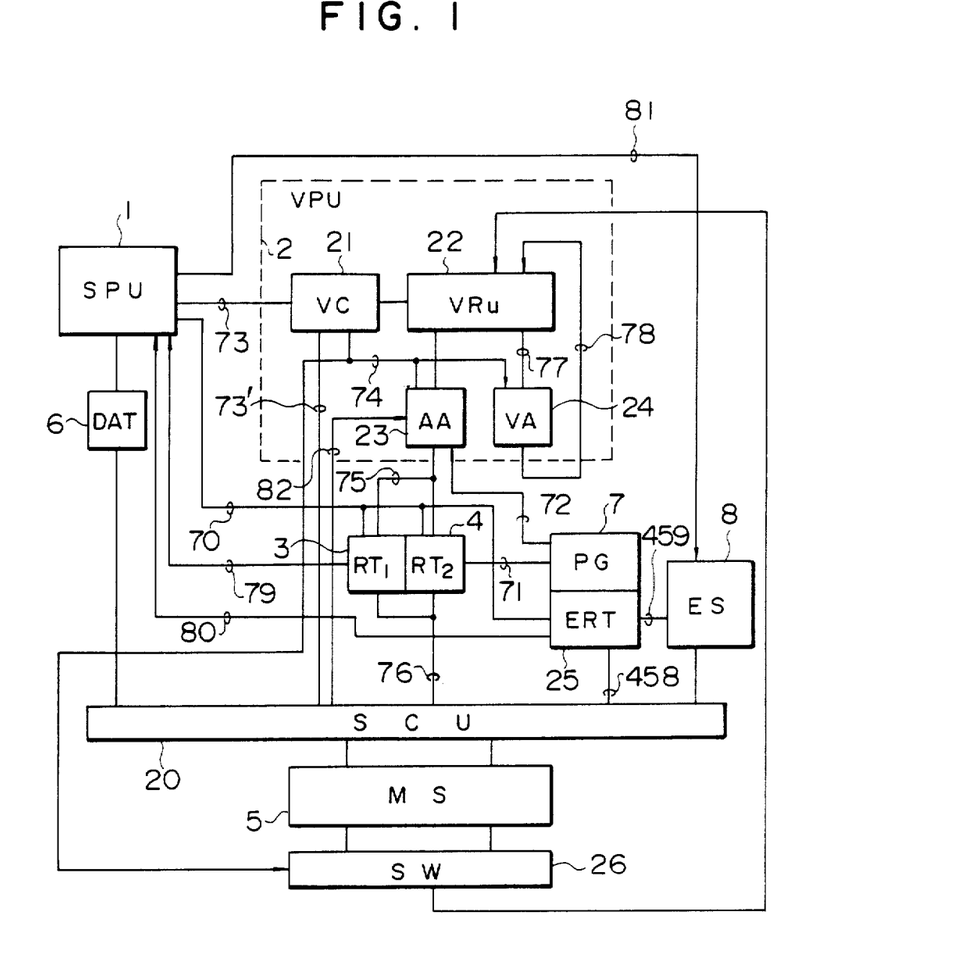
FIG. 1 is a schematic block diagram showing a vector processor according to the present invention.

In an embodiment of the vector processor according to the present invention, there are included, as shown in FIG. 1, a scalar processing unit 1, a vector processing unit 2, relocation tables 3 and 4, a main storage 5, a dynamic address translation unit 6, a paging processing unit 7, an extended storage 8, a main storage controller 20, a relocation table 25 for an extended storage access, and a switching circuit 26. The vector processing unit 2 comprises a resource controller 21, a vector register 22, an address generator 23, and a pipeline arithmetic unit 24.

In the configuration described above, an address contained in an access request from the scalar processing unit 1 to the main storage 5 is converted from a logical address into a real address by the dynamic address translation unit 6. In addition, an address included in an access request issued from the address generator 23 of the vector processor 2 is translated from a logical address into a real address by referring to either one of the relocation tables 3 and 4. These two kinds of relocation tables 3 and 4 are respectively employed depending on the addresses. The relocation tables 3 and 4 respectively output addresses used to access spaces ① and ② of the main storage 5 of FIG. 2. Values of the relocation tables 3 and 4 are set by the scalar processing unit 1 through a path 70. The relocation table setting and the operation of the vector processing unit 2 are controlled by a program of the scalar processing unit 1 such that these operations are not effected at the same time. In order to achieve the control described above, the instruction set of the scalar processing unit 1 includes an instruction to judge a busy state of the vector processing unit 2.

The relocation table 4 ($RT_2$) includes a bit for identifying a space existing in the main storage 5 and one not existing therein and R and C bits indicating a history of reference to the main storage 5. When the vector processing unit 2 attempts to access a space not existing in the main storage 5, a signal to initiate the paging processor 7 is set to a path 71 from the relocation table 4. The paging processor 7 is provided with a relocation table 25 therein for an access to the extended storage 8. The relocation table 25 is abbreviated as ERT herebelow. Although the embodiment according to the present invention includes the ERT 25 configured as a hardware system, namely, the logical address is translated into a real address on the request source side, the ERT 25 may also be disposed in the main storage 5. In the latter case, the paging processing unit 7 issues a logical address to the ES 8, which reads the area of the ERT 25 in the MS unit on receiving the logical address so as to access the ES 8 by use of a real address translated from the logical address. The ERT 25 is located with a value, in a case of the initialization, by the scalar processing unit 1 via the path 70. The rewrite operation of the ERT 25 during a vector processing is achieved in the paging processing unit 7.

When the vector processing unit 2 attempts to reference an area not existing in the main storage 5, the paging processing unit 7 outputs an address generate processing interrupt indication via the path 72 to the address generator 23 in the vector processing unit 2. The paging processor 7 reads the R and C bit sections or fields from the relocation table 4 ($RT_2$) in order to load the area not existing in the main storage 5 from the extended storage 8 into the main storage 5. The R and C bit sections correspond to a real space in the main storage 5. By use of the R and C bit information thus read out, the paging processor 7 sets an address of an area in the main storage 5 which is put to the extended storage 8 and then puts the area address to the extended storage 8; thereafter, the data of the area not existing in the main storage 5 is retrieved or obtained from the extended storage 8 so as to be put into an area in the storage 5. In addition, the paging processor 7 rewrites, in association with the sequence of operations above, information of the relocation table 4 ($RT_2$) related to the main storage 5. That is, the identification bit in the main storage area put to the extended storage 8 is rewritten such that the identification bit of the new area loaded from the extended storage 8 is rewritten to indicate the presence thereof and then translation information to be employed in the address translation into a real address in the main storage is set. When accessing the extended storage 8, the paging processor 7 uses information of the ERT 25, said information being set by the scalar processing unit 1 prior to the job execution. There does not exist any case in which the paging processor 7 rewrites the content of the ERT 25. Incidentally, for the details about the MS5, SCU 20, and SW 26, reference may be made to the configuration of, for example, Hitachi's Model S810 machine.

In FIG. 1, the vector processing operation is accomplished as follows.

In the case where an initiation of operation is issued from the scalar processing unit 1 to the vector processing unit 2, an initiation signal is sent via a path 73 to the resource controller 21. The resource controller 21 then reads a sequence of vector instructions in the main storage 5 via a path 73' and decodes the vector instruction sequence so as to initiate a resource necessary for an execution of the vector instructions via a path 74. When the decoded instruction is a vector load instruction, the address generator 23 generates a sequence of logical addresses of the vector data and sends the logical address sequence to a path 75. The logical address thus generated is referenced by either one of the relocation tables 3 and 4 so as to be translated into a real address, which is then sent to a path 76. By using the address, an area associated with the address is accessed such that the vector data is written in a vector register 22 indicated by an operand of the vector instruction. In this processing, when the area in the main storage 5 specified by the address which has undergone address translation does not contain the objective data, the processing operations of the extended storage 8 and the paging processor 7 described above are initiated.

In the case where the decoded instruction is a vector store instruction, the processing of the load instruction above is achieved where the processing of the switching circuit 26 and subsequent component is excepted. Moreover, in the case where the decoded instruction is an instruction related to a vector operation, there is effected processing in which data is transferred between the vector register 22 and the pipeline arithmetic unit 24 via the paths 77 and 78 so as to effect arithmetic operations thereof.

When the address sequence generated by the address generator 23 cannot be translated by use of the relocation table 3 (RT1), interrupt information is reported via a path 79 to the scalar processing unit 1. In the case where the address of the extended storage 8 produced by the paging processor 7 indicates an area associated with another job, interrupt information is sent to the scalar processing unit 1 via a path 80.

When an extended storage is used as an external storage of the multi-virtual space as indicated by the path 50 of FIG. 2, a path 81 is be employed when the operating system directly issues an instruction from the scalar processing unit 1 to the extended storage 8.

Figure 3:
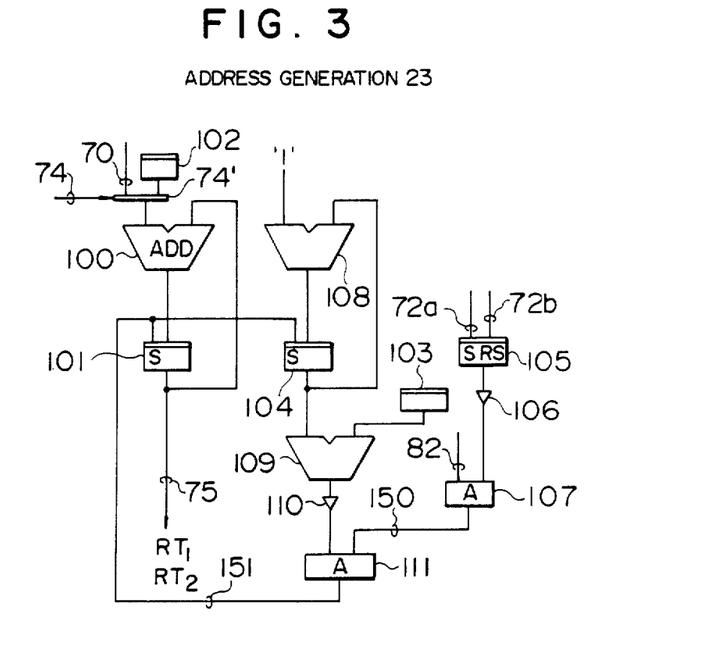
FIG. 3 is a block diagram showing an address generate circuit.

Next, the operation of the address generator 23 will be described with reference to the block diagram of FIG. 3 showing the address generator 23 of FIG. 1.

In FIG. 3, a base address to be used as a base of the vector data to be generated is sent via the path 70 and an adder 100 so as to be set into a register 101. At the same time, the scalar processing unit 1 sets a displacement value of the main storage 5 associated with the vector data into the register 102 and a vector length into a register 103. (The paths between the scalar processing unit 1 and these registers are omitted for simplification of the drawing.) In addition, a register 104 is cleared to 0. Values are set into the registers 101 to 104 prior to the initiation of the vector processing unit 2, which is referred to as setup processing in some cases herebelow.

When operation of the vector processing unit 2 is initiated, an initiation signal is supplied from the resource processing unit 21 (FIG. 1) via the path 74 to the address generator 23. In response to the initiation signal, a selector 74' connects an output from the register 102 to the adder 100.

Paths 72a and 72b are respectively loaded with signals indicating the processing interruption and the processing restart of the address generator 23 from the paging processor 7. In FIG. 3, it is assumed that the paths 72a and 72b correspond to the processing interrupt indication and the processing restart indication. A flip-flop 105 keeps these two kinds of indications. The initial state of the flip-flop 105 is "0".

A path 82 is supplied with a release signal from the main storage 5 (FIG. 1). The release signal is used when a plurality of resources reference the same bank in the main storage 5 at the same time so as indicate, each time a request is processed by the main storage 5, the completion of the processing of the request to the source side. An address request to the address generator 23 is sent via the path 82.

An output from the flip-flop 105 is inverted by an inverter 106 so as to be ANDed with the release signal on the path 82 by means of an AND circuit 107. The obtained output on a path 150 indicates that the main storage controller 20, the paging processor 7, and the main storage 5 are in a state ready for transmitting an address for the next vector data.

The data in the register 104 is incremented by one in an adder 108, and the resultant data is compared in a comparator circuit 109 with the vector length of the register 103. When these data items match with each other, the comparator circuit 109 delivers an output of "1". The output from the comparator circuit 109 is inverted by an inverter 110 so as to be ANDed with the signal on the path 150 by means of an AND circuit 111, which delivers an output indicating whether or not the next vector data can be transmitted. The output is supplied via a path 151 so as to be used as a set condition for the registers 101 and 104. The address stored in the register 101 is fed via the path 75 to the relocation table.

Figure 4:
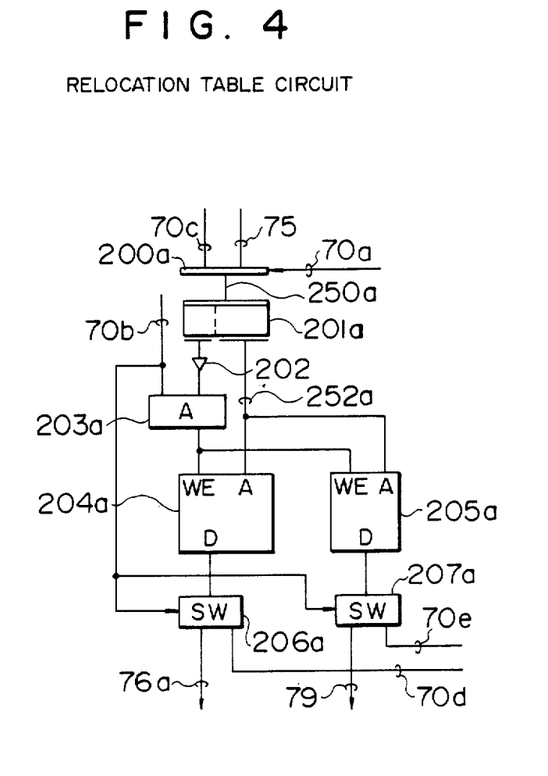
FIG. 4 is a block diagram schematically showing a relocation table.

FIG. 4 is a block diagram showing the configuration of the relocation table 3 (RT1) of FIG. 1. Description will now be given of the operation of the relocation table 3 (RT1) with reference to FIG. 4.

In FIG. 1, the path 70 includes a plurality of signal lines for the write indication, the write address, and the write data to be supplied to the relocation table 3 (RT1). In FIG. 4, the respective signal lines of the path 70 are indicated with subscripts of alphabetic letters as 70a to 70e.

In FIG. 4, when the scalar processing unit 1 writes data in the relocation table 3 (RT1), a signal on the path 70a acts upon a selector 200a so as to connect the path 70c to a path 250a. The path 70c is supplied with a write destination address of the relocation table 3 (RT1) from the scalar processing unit 1. The write address is stored in a register 201a. On the other hand, the scalar processing unit 1 determines the operation of the relocation table 3 (RT1) by use of an order sent to the path 70b to indicate the operation thereof.

In the case where the high-order bit of the address stored in the register 201a is "0", it is determined to access the relocation table (RT1) of FIG. 4. The high-order bit of the address in the register 201a is inverted by an inverter 202 so as to be ANDed with the order on the path 70b in an AND circuit 203a. When there exist a plurality of high-order bits in the address, the AND operation is effected on all the bits so as to send the resultant value to the inverter 202. In FIG. 4, for simplification of the configuration, the address includes only one high-order bit. An output from the AND circuit 203a is connected to write enable terminals respectively of RAM elements 204a and 205a. On the other hand, the low-order address of the register 201a is connected to address terminals respectively of the RAM elements 204a and 205a via a path 252a.

The paths 70d and 70e are respectively supplied from the scalar processing unit 1 with a real address and an invalid bit for the relocation processing. The invalid bit is set to "1" for a real storage area of the main storage 5 assigned to another user and to "0" for one assigned to the pertinent user. Signals on the paths 70d and 70e are respectively connected to data terminals of the RAM elements 204a and 205a by means of switching circuits 206a and 207a, respectively. In this situation, an order signal on the path 70b is fed to the switching circuits 206a and 207a so as to connect the paths 70d and 70e to the data terminals of the RAM elements 204a and 205a, respectively.

After the setup processing is completed, the scalar processing unit 1 sets the signal on the path 70a and the order signal on the path 70b so as to enable an access request from the vector processing unit 2 to the main storage 5 to be processed. That is, the paths 75 and 250a are connected to each other by means of the selector 200a and the data terminals of the RAM elements 204a and 205a are respectively linked with the path 76a to the SCU 20 and the path 79 to the SPU 1.

An address from the vector processing unit 2 is supplied from an address generator AA (FIG. 3) onto the path 75. This address is stored in the register 201a and then is connected to the address terminals of the RAM elements 204a and 205a. Data read from the RAM element 204a is sent via the switching circuit 206a and the path 76a to the main storage control unit 20. Data from the RAM element 205a is sent via the switching circuit 207a and the path 79 to the scalar processing unit 1. When the value on the path 79 is "1", it is indicated that an attempt is made to access an invalid address in the main storage 5. The scalar processing unit 1 initiates an exception processing routine by use of the data. Furthermore, in place of this processing, it may also be possible to send the data on the path 79 to the main storage control unit 20 so as to cancel the request referencing an invalid area in the main storage 5. This logic is not directly related to the gist of the present invention, and hence description thereof will be omitted.

Figure 5:
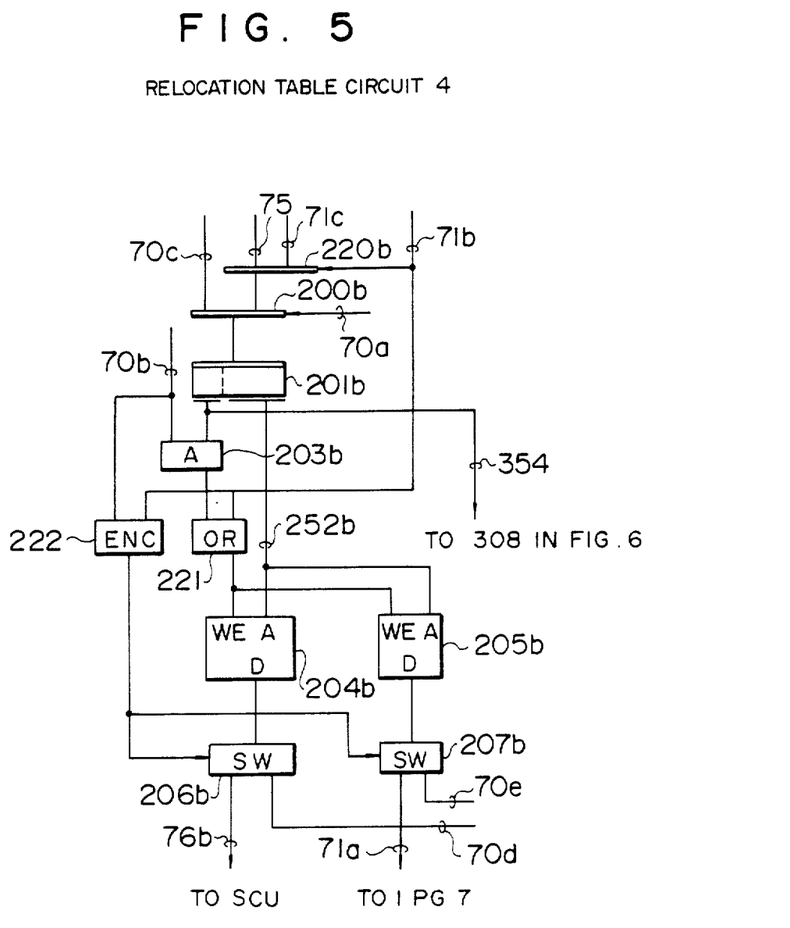
FIG. 5 is a block diagram showing a relocation table for a vector access space.

FIG. 5 is a block diagram showing the relocation table 4 (RT2) of FIG. 1 excepting the logic concerning the R and C bit sections. Description will be given of the operation of the relocation table 4 (RT2) with reference to FIG. 5.

Figure 6:
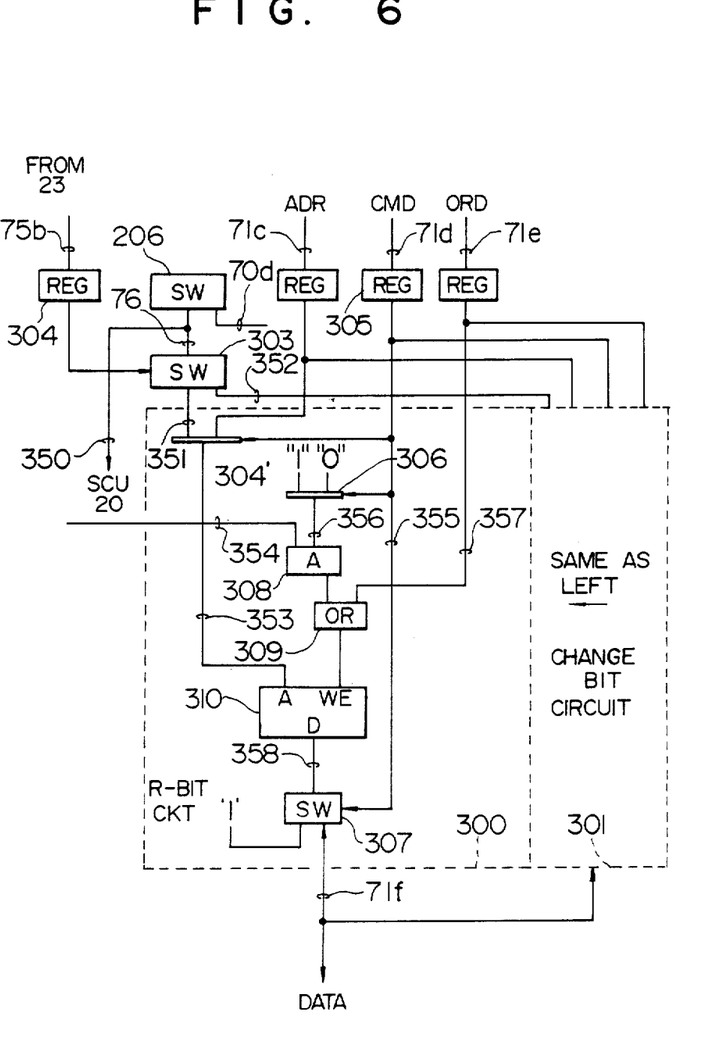
FIG. 6 is a block diagram showing reference (R) and change (C) bit sections of the vector access space.

The logic of FIG. 5 is employed to write data from the scalar processing unit 1 and the paging processor 7 into the relocation table 4 (RT2) and to read data from the vector processing unit 2. Of these operations, the operations concerning the scalar processing unit 1 and the vector processor 2 are similar to those described with reference to the relocation table 3 of FIG. 4, and hence description thereof will be omitted. However, data stored in the RAM element 205b is not the invalid bit indicating the main storage space of another user but is an identification bit indicating a portion of the space of the pertinent user not existing in the main storage 5. This bit will be referred to as a paging bit herebelow. When the vector processing unit 2 is referencing the relocation table 4 (RT2), if an access is effected to an area associated with the paging bit "1", a paging processor initiation signal is delivered to the path 71a. With this signal, the operation of the paging processor 7 is initiated such that a processing interrupt indication is sent therefrom to the address generator 23 and an operation to read the R and C bit sections of FIG. 6 is effected, which will be described later. Thereafter, various operations take place in the paging processor 7. During the operation above, the paging processor 7 accomplishes a write operation on the relocation table 4 (RT2). In this situation, a write indication of the paging processor 7 is effected via the path 71b. In response to the write indication, the selector 220b selects the side of the path 71c, which is supplied with address information. An OR circuit generates, in response to a write request from the paging processor 7, a write enable signal for the RAM elements 204b and 205b. There does not occur a case where a collision takes place between an access request from the scalar processing unit 1 or the address generator in the vector processing unit 2 and the write request from the paging processor 7.

The signals on the paths 70b and 71b are encoded by an encoder 222 so as to be used as selection signals associated with the switching circuits 206b and 207b, respectively.

FIG. 6 is a block diagram showing the R and C bit sections of the relocation table 4 (RT2) of FIG. 1. In FIG. 6, the portion enclosed with dotted lines 300 includes the circuit components related to the R bit. The portion enclosed with dotted lines 301 comprises circuit elements concerning the C bit, which is identical in the logical configuration to that of the portion associated with the R bit, and hence this portion is omitted for simplification of the drawing. The switching circuit 206 of FIG. 6 is identical to that shown in FIG. 5 such that FIG. 6 is to be connected to FIG. 5.

In FIG. 6, an output from the switching circuit 206 is inputted via the path 76 to the switching circuit 303. A sink destination (designated as a path 350) of the path 76 is the main storage control unit 20.

The address generator 23 of FIG. 1 identifies whether a vector instruction is associated with a load or store operation. Information denoting the discrimination therebetween is supplied to the path 75b so as to be stacked in a register 304, thereby controlling a switching circuit 303. The switching circuit 303 sends the address information on the path 76 to the path 351 when the vector instruction is related to a load operation and to the path 352 when the vector instruction is associated with a store operation.

The selector 304' connects the path 351 to the path 353 when the address generator circuit 23 is in operation. Whether or not the address generator circuit 23 is currently in operation is controlled by the paging processor 7. Information of the control is transmitted onto the path 71d so as to be stacked in the register 305, thereby controlling, via the path 355, the selectors 304' and 306 and the switching circuit 307.

In addition to the output above, the paging processor 7 delivers outputs onto the paths 71c, 71e, and 71f associated with address data, order information, and data. The path 71f is a bidirectional path.

When information on the path 355 indicates a vector access, the selector 306 sends "1" onto the path 356. Information on the path 356 is ANDed with the high-order address on the path 354 in the AND circuit 308. The resultant data is passed to the OR circuit 309 so as to be inputted to a write enable terminal of the RAM element 310. In this situation, the circuit system is controlled by the paging processor 7 such that the signal values on the paths 71e and 357 are 0. In addition, the switching circuit 307 connects the paths so as to propagate "1" onto the path 358.

Through the logical operations above, in a case of a vector load operation, "1" is written in the R bit position of the real address on the path 76. Similarly, in a case of vector store processing, "1" is written in the C bit.

Figure 7:
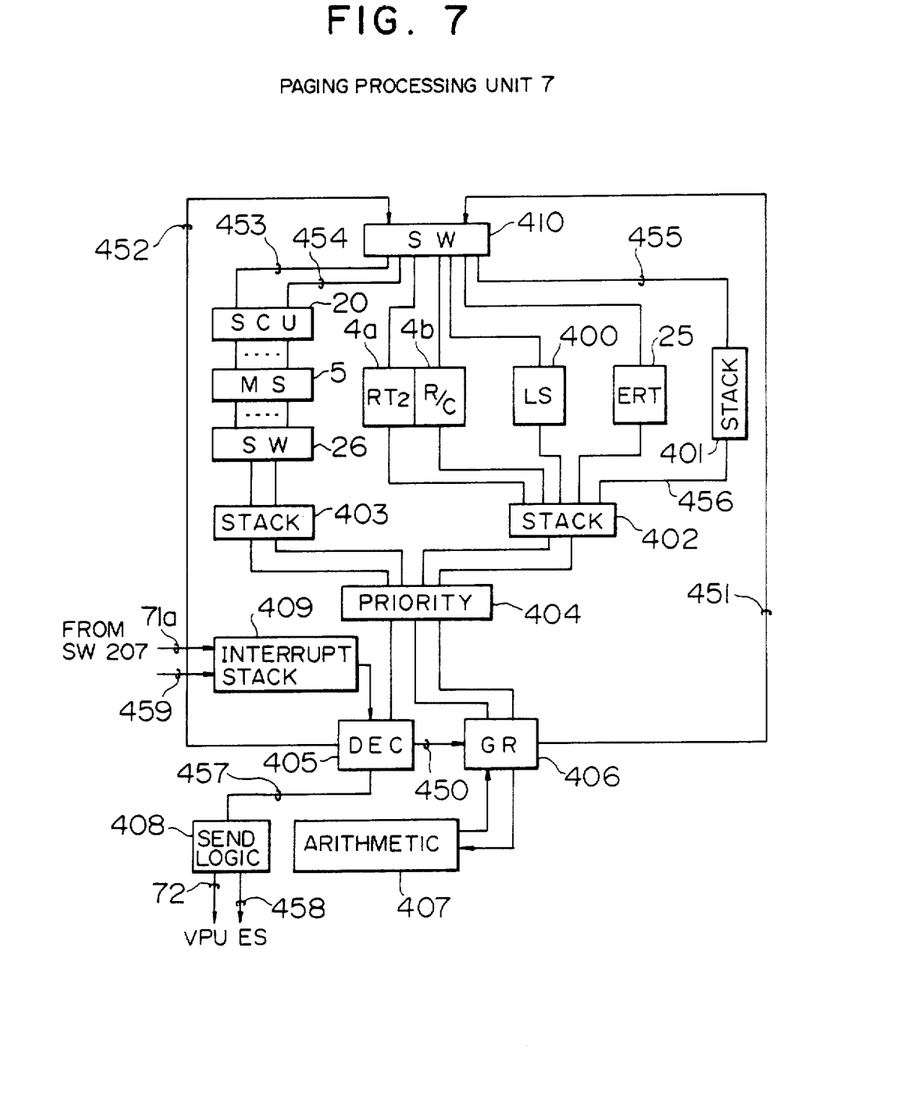
FIG. 7 is a conceptual block diagram showing a paging processor.

FIG. 7 is a schematic block diagram showing the paging processor 7 of FIG. 1. The paging processor develops the following functions.

(1) Write and read operations for the relocation table 4 (RT2) and R and C bits (2) Operation interruption and restart of the address generator 23 of the vector processing unit 2

(3) Initiation and read/write operation of the extended storage 8 and read/write operation of the main storage 5

(4) Description of a partition among the logical partitions of the main storage 5 to be saved onto the extended storage 8

It is difficult to implement these four functions by means of a wiring logic of the hardware because the amount of the hardware required is considerably increased. In consequence, in the embodiment according to the present invention, a program implementing the functions is loaded in a local storage or in the main storage 5 so as to be executed by use of the paging processor 7. In order to achieve the processing configuration above, the paging processing unit 7 preferably possesses the following hardware constitution.

(1) Function to send requests generated in the paging processor 7 associated with various store means to the objective storages. The store means include the main storage, the local storage (LS), the relocation table (RT2), the extended relocation table (ERT), and the R and C bits.

(2) Registers to keep states of the paging processor and the address generator in the vector processing unit 2.

(3) Work registers for the algorithm to determine a logical partition of the main storage 5 to be written into the extended storage 8.

(4) Function to decode and to execute instructions.

(5) Function to issue indications to external logic units such as the address generator and the extended storage 8.

(6) Function to receive interruptions from external logic units such as the relocation table 4 (RT2) and the extended storage 8.

In FIG. 7, the configuration includes a logic circuit 409 for receiving an interrupt signal from an external logic circuit, a section 405 for decoding an instruction, a general register section 406 for keeping various information items, an arithmetic unit 407, a logic unit 408 for sending a signal to an external logic unit, and a local storage (LS) 400. When the vector processing unit is initialized, the registers in the general register section 406 are cleared to "0".

When the paging processor 7 is initiated by the switching circuit 207 of FIG. 5 via the path 71a, the logic circuit 409 initiates the decoder 405 such that an operation is effected via the path 450 so as to supply the switching circuit 410 via the path 451 with the first address ("0" in this case) of the local storage 400 storing the paging processing program, said address being stored in the general register section 406. At the same time, the decoder 405 sends a command and an order signal via the path 452 to the switching circuit 410. In FIG. 7, it is assumed that various storages are supplied with signals associated with a request command indicating an access thereto, an order defining details of the command, an address, and data. However, for simplification of the drawing, these signals may be represented with a path or several paths. Moreover, in some orders, there is included, in addition to the information defining details of the access, sink information indicating a source of the request, namely, information meaningful on the sink side. The sink information is passed through the storage without any modification thereof so as to be returned to the request source side. A response from the storage includes an advance indicating a valid indication signal to indicate a transmission of the data thus read out, read data, and the sink information. By adding the sink information to the request and the advance, a plurality of requests can be processed in the main storage control unit 20 in a concurrent fashion. The sink information is delivered from the switching circuit 410 onto the paths 453, 454, and 455. The main storage controller 20 can receive a plurality of requests. Paths 453 and 454 respectively are an instruction read path and a data read/write path associated with the paging processor 7. Among the requests to the relocation table RT$_2$ 4a, the R and C bit section 4b, the local storage 400, and the ERT 25, there does not occur any contention or conflict because banks thereof are independent of each other. In consequence, the sink information is controlled by the stack section 401 in a centralized manner. That is, the stack 401 keeps the sink information for a period of an access time necessary for the storage such that the sink information is sent to the path 456 when a predetermined number of cycles are effected thereafter.

Data read from the main storage 5 or any one of the various storage sections is temporarily kept in the stacks 403 and 402 so as to be supplied therefrom to a priority circuit 404. In the priority circuit 404, the two data items associated with the main storage 5 and the data from other storage units are combined in a flow of data, which is transmitted according to the sink information to the decoder 405 or to the general register section 406.

The decoder 405 operates depending on an indication of an instruction read from the local storage 400 or the main storage 5 to process the data of the general register section 406 by means of the arithmetic unit 407 or to access the main storage 5 or any one of the various storage units according to an indication of the program. In addition, when the instruction requests processing to be effected on the address generator 23 of the vector processing unit 2 and the extended storage 8, an indication is issued via the path 457 to the logic circuit 408, which then generates an order and other necessary signals. The order and other signals thus generated are sent via the path 72 to the address generator 23 and via the path 458 to the extended storage 8.

Figure 8:
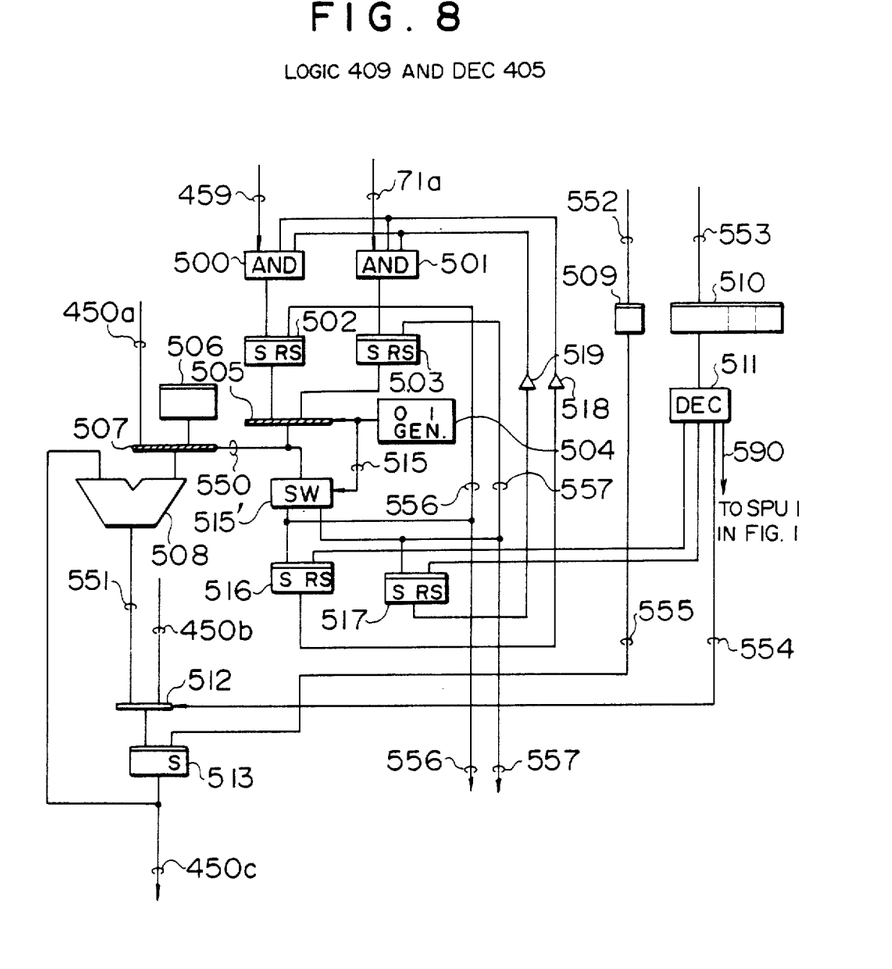
FIG. 8 is a block diagram showing a decoder section.

FIG. 8 is a block diagram showing the logic circuit 409 and the instruction address generator in the decoder 405.

In the configuration of FIG. 8, an interrupt signal is fed from the relocation table 4 (RT2) to the path 71a and an interrupt signal from the extended storage 8 is sent to the path 459. These signals are respectively ANDed in the AND circuits 500 and 501 so as to set the flip-flops 502 and 503, respectively. The logic circuit 504 is a generator of which the output alternately changes as 1→0→1→... for each machine cycle. The output from the generator acts upon the selector 505 so as to send the output from the flip flop 502 or 503 onto the path 550 for each machine cycle.

The register 506 is loaded with a word length of an instruction to be processed by the paging processor 7. The path 450a is supplied with an instruction address read from the general register section 406 of FIG. 7. The selector 507 selects these signals depending on the signal on the path 550 and sends the signals to the adder 508. Data outputted from the adder 508 onto the path 551 is a first address of an interrupt processing routine to be initiated by an external interruption or an address obtained by adding an integral multiple of the instruction word length to the address above. The path 450b delivers an output from the general register section 406 of FIG. 7, namely, data read from the general register section 406 when control is branched to an objective address associated with the instruction. In contrast therewith, the path 450a is provided to transfer control to an address beforehand registered to the general register section 406 in response to an external interruption.

An instruction read from the main storage 5 or another store means such as the local storage of FIG. 7 is stored via the path 553 in the register 510. An advance for the instruction on the path 553 is supplied onto the path 552 so as to be stored in the register 509. The instruction in the register 510 is decoded by the decoder 511 and it is determined whether or not the instruction is a branch instruction. An output indicating this judgement is sent to the path 554 to enable the selector 512. In a case where the instruction in the register 510 is a branch instruction, the selector 512 sends the data on the path 450b to the register 513. The advance signal once stored in the register 509 is delivered via the path 555 so as to be used as a set signal for the register 513.

The instruction address in the register 513 is passed via the path 450c to the general register section of FIG. 7 and is therefrom transferred via the path of FIG. 7 to components such as the main storage 5.

On the other hand, the signal sent onto the path 550 is sent to the switching circuit 515' so as to set either one of the flip-flops 516 and 517 disposed in association with the interruption sources. At the same time, the flip-flops 502 and 503 are reset via the paths 556 and 557, respectively. These reset operations indicate that the external interruption has been accepted. Outputs from the flip-flops 516 and 517 are respectively inverted by the inverters 518 and 519 and are then inputted to the AND circuits 500 and 501, respectively. These AND circuits 500 and 501 serve as a mask for the external interruption.

When the decoder 511 detects an instruction such as an instruction for transferring MS data by the paging processor 7, a path 590 is used to report the result of detection to the scalar processing unit 1 (in FIG. 1). The scalar processor unit 1 uses the result of detection thus reported as one of the conditions for task switch action.

Figure 9:
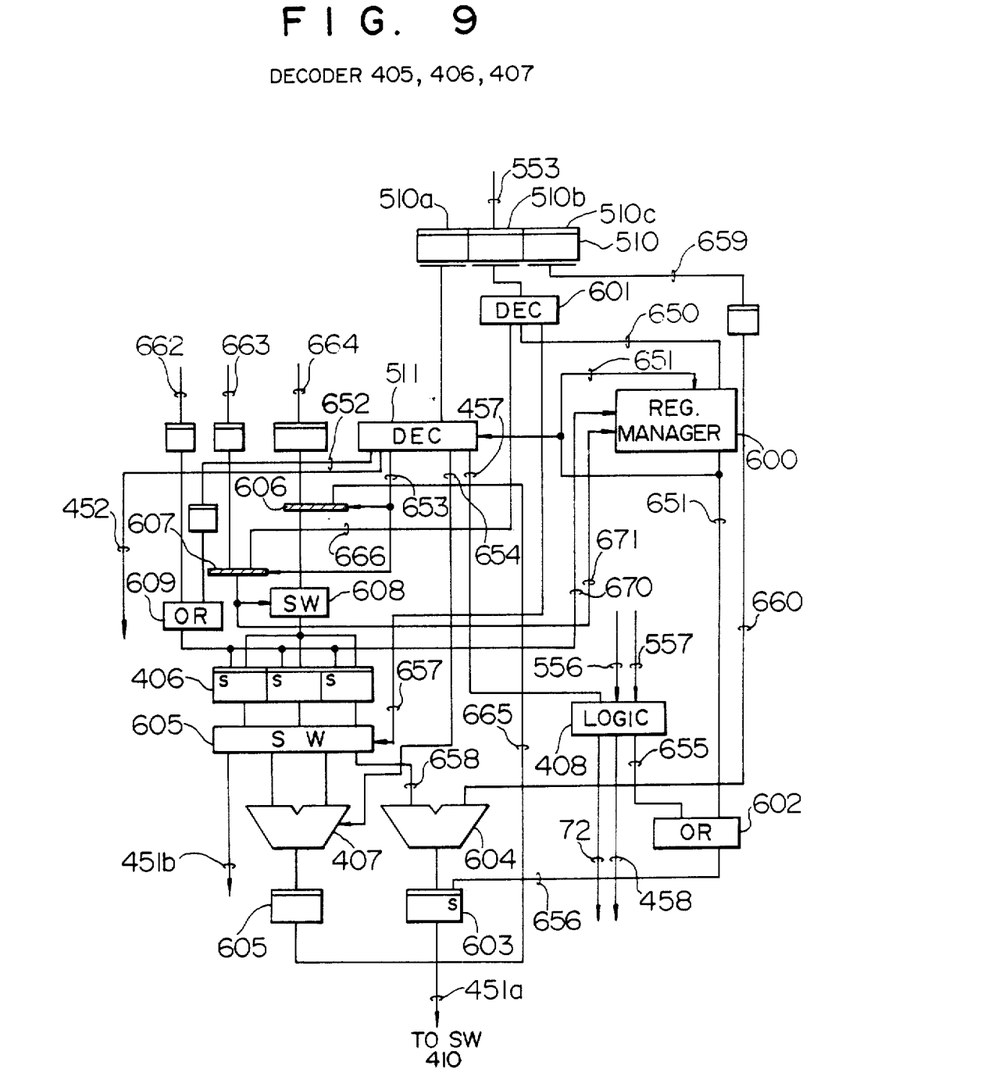
FIG. 9 is a block diagram showing an instruction decode section and a register section.

FIG. 9 shows a block diagram including the operand access section of the instruction decoder 405, the register section 406, and the arithmetic unit 407 of Fig. 7. In the configuration of FIG. 9, the same reference numbers are assigned to the same logical units as those of FIGS. 7 and 8. In the case where a plurality of signal lines are drawn from a logic unit having the same reference numeral, a portion of or all of the signal lines is or are omitted if not related to the description of FIG. 9.

In FIG. 9, an instruction read from the main storage 5 is stored in the register 510. The instruction includes three fields, namely, an operation field 510a, an operand field 510b, and a displacement field 510c. The paging processor 7 controls execution of the instruction as follows. There are two types of instructions. For one type of instruction having a significant register number in the operand field 510b by which the register is in a busy state, and for the other type of instruction of a format which is processed by an external logic unit, the operation ranging from the start of the execution of the instruction to the end thereof is controlled by a dedicated control circuit. That is, the former type of instruction is controlled by the register control circuit 600; whereas the latter type of instruction is controlled by the logic circuit 408.

The register number described as an operand of the instruction stored in the register 510 is decoded by the decoder 601 so as to send a signal value "1" onto the path 650. The path 650 is a cable comprising a plurality of signal lines corresponding to the respective registers. The register control circuit or register manager 600 transmits a signal value "1" indicating an instruction executable state onto the path 651 if a register associated with the signal on the path 650 is in an empty state; whereas, a signal value "0" denoting an instruction unexecutable state is sent onto the path 651 if the register is occupied by other processing. The signal on the path 651 acts upon the decoder 511 so as to send indication signals for the various resources onto the paths 652, 653, 654, and 457. In addition, the signal on the path 651 causes register manager 600 to set the register indicated by the signal on the path 650 to the busy state.

In the case where the instruction stored in the register 510 requests processing to be effected on a resource of the vector processor other than the paging processor 7, the operation code field 510a of the instruction is decoded by the decoder 511 so as to be transmitted as decoded information onto the path 457. The decoded signal is processed by the logic circuit 408 to generate order information necessary for the processing and then the resultant signal is sent onto the paths 72 and 458. These path 72 and 458 are connected to the address generator 23 of the vector processing unit 2 and the extended storage 8, respectively. When the logic circuit 408 transmits an order for the instruction processing, a signal value "1" is fed to the path 655. The signal on the path 655 is ORed with the signal on the path 651 by means of the OR circuit 602, thereby supplying the ORed result to the path 656. This signal is used as a set signal for the register 603.

The content of the register designated by the operand field 510b of the instruction in the register 510 is selected by the switching circuit 605 in response to the signal on the path 657 so as to be delivered to the path 658. The displacement of the instruction in the register 510 is inputted via the paths 659 and 660 into the adder 604. The adder 604 generates an operand fetch address based on the content of the register specified by the instruction and the displacement and then sends the address to the register 603. The set condition of the register 603 is satisfied when an initiation of the instruction in the register 510 becomes to be possible. An output from the register 603 is sent via the path 451a to the switching circuit 410 of FIG. 7. The operational information of the switching circuit 410 is produced by the decoder 511 and is then supplied to the path 452.

The paths 662 to 664 are adopted to send data from the priority circuit 404 to the general register section 406 of FIG. 7. In the configuration of FIG. 7, although there are indicated two signal lines for the sink information and data, the configuration of FIG. 9 includes three lines because a signal line indicating the validity of data is additionally provided, namely, the enable signal on the path 662, the sink information on the path 663, and data on the path 664.

On the other hand, an output from the arithmetic unit 407 is first stored in the register 605 and is inputted therefrom via the path 665 to the selector 606. The result of the operation effected by the arithmetic unit 407 is stored in a register specified by the instruction. The decoder 601 decodes the operand field 510b of the instruction so as to send a register number of the sink destination onto the path 666. The selection between the paths 664 and 665 is achieved depending on the operation code of the instruction. The decoder 511 decodes the instruction code or operation code and then sends path select information onto the path 653. The selectors 606 and 607 operate according to the indicated above.

The sink information selected by the selector 607 acts upon the switching circuit 608 so as to write data selected by the selector 606 in a predetermined register of the general register section 406. The set signal for the register is produced by ORing the output on the path 662 and the data on the path 652 of the decoder 511. The register set signal is inputted via the path 670 into the register manager 600 so as to release the register busy state. The sink information is also sent to the path 671 in this operation.

Figure 10:
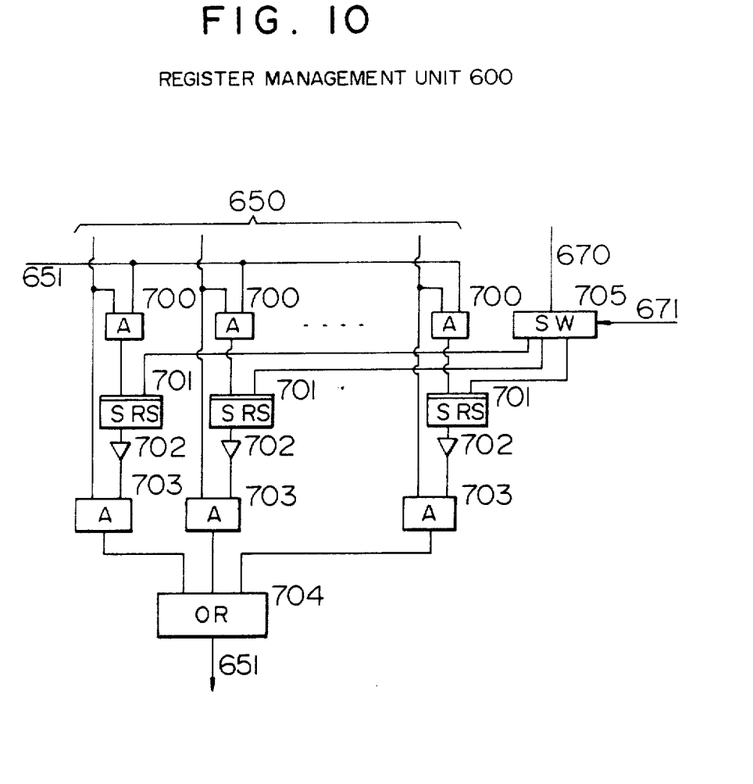
FIG. 10 is a block diagram showing a register control circuit.

FIG. 10 is a block diagram showing the register manager or register management unit 600 of FIG. 9. In FIG. 10, a register to be used by the instruction is supplied via the path 650 with a signal value "1" from the decoder 601 of FIG. 9. On the other hand, when an initiation of the instruction is enabled according to the logic described with reference to FIG. 9, a signal value "1" is supplied onto the path 651. These signals are ANDed by the AND circuit 700 so as to set the flip-flop 701. The flip-flop 701 is disposed in association with the respective register such that when the value is "1" or "0", the corresponding register is indicated to be busy or available, respectively.

An output from the flip flop 701 is inverted by the inverter 702 so as to be inputted to the AND circuit 703, which effects an AND operation between the inverted signal and the signal on the path 650. An output from the AND circuit 703 is subjected to an OR operation by the OR circuit 704 so as to deliver the ORed result to the path 651. When the signal value of the path 651 is "1", it is indicated that the register specified by the signal value of the path 650 is available.

When the paths 670 and 671 are respectively supplied with an indication signal for releasing the register and a register number for the release operation, the switching circuit 705 sends an indication signal to a predetermined flip flop 701.

Figure 11:
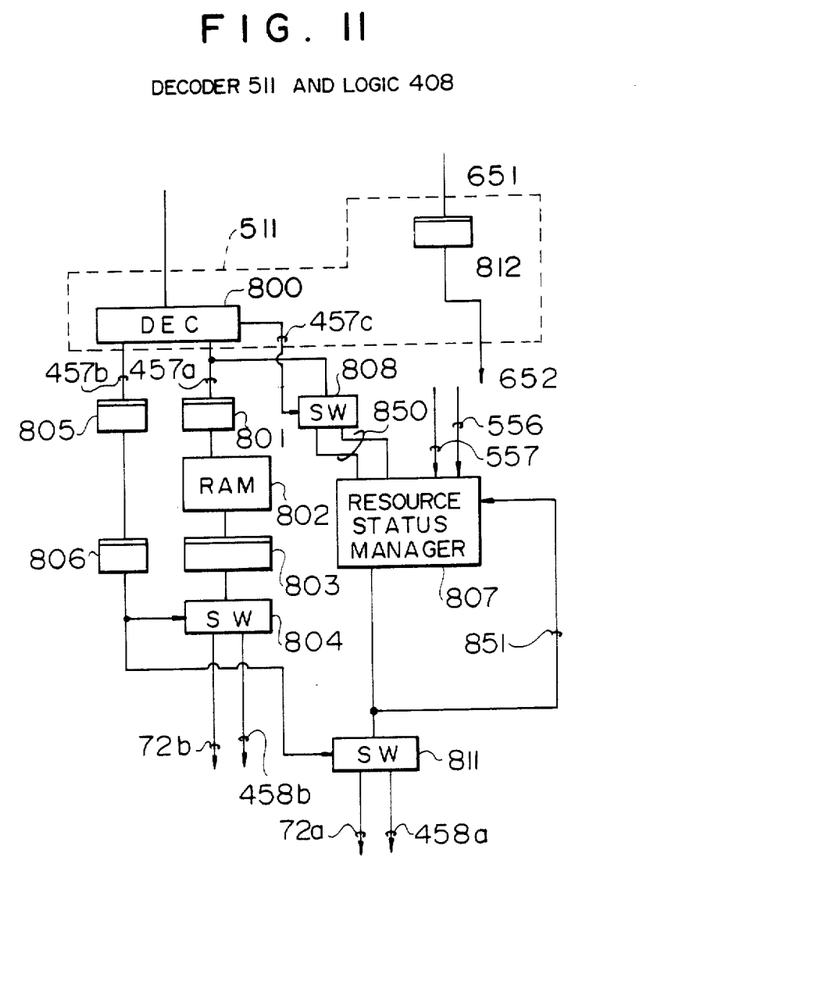
FIG. 11 is a block diagram showing a decoder and a logic circuit.

FIG. 11 is a block diagram showing the decoder 511 and the logic circuit 408 of FIG. 9. In FIG. 11, a portion enclosed with dotted lines 511 corresponds to the decoder 511 of FIG. 9. In the configuration of FIG. 9, although the path 457 is indicated as a signal line, the configuration of FIG. 11 includes signal lines 457a to 457c having different meanings.

In FIG. 11, when the decoder 800 decodes an instruction which requests processing to be achieved on a resource other than the paging processing unit 7, the path 457a is supplied with a signal to produce an order for an execution of the pertinent instruction. In addition, the paths 457b and 457c are supplied with a signal indicating a resource as a destination of the order thus produced. The signal on the path 457a is stored in the register 801 and is then used to generate an order and other information items necessary for the instruction execution by referencing the RAM element 802. These information items including the order thus generated are kept in the register 803 so as to be sent therefrom to the objective resource by means of the switching circuit 804. The registers 805 and 806 are disposed for effecting an operation to match the operation timing. The paths 72 and 458 are connected, on the sink side thereof, to the address generator 23 of the vector processing unit 2 and the main storage control unit 20 (FIG. 1), respectively.

On the other hand, when an external resource is initiated, the switching circuit 808 sends a signal value "1" onto a path 805 corresponding to the initiated resource.

The logic circuit or unit 807 manages the state of the resource and effects a similar operation to that of the register management unit 600 to FIG. 10. In the resource management unit 807, there is provided a flip-flop for keeping a state of a resource. The flip-flop is set when the value of the signal on the path 851 becomes to be "1" and is reset when the signal value of the path 556 or 557 is "1". The selection of the flip-flop is accomplished by use of a signal on the path 850.

In the case where the resource management unit 807 has determined that an initiation of the instruction is possible, a signal value "1" is sent onto the path 851.

When the register is judged to be available at an instruction execution, the path 651 is beforehand supplied with a signal value "1". This signal is latched into the register 812 and is supplied therefrom via the path 652 to the OR circuit 609 of FIG. 9.

In the case where the resource is judged to be unavailable at the time of execution of an instruction the switching circuit 811 functions to transmit an order validity indication signal onto the paths 72a and 458a, which correspond to the paths 72b and 458b, respectively.

As described above, according to the present invention, even when a large logical space is allocated to load therein a program, it is possible to increase the extended storage area by relatively reducing the main storage area. In this two-stage storage constitution, the data transfer between both storage areas is integrally configured with an address translation unit so as to implement the primitive portion associated with the data transfer processing by means of a hardware system, thereby increasing the data transfer speed and minimizing the load imposed on the processing of the operating system related to the address translation. As a result, there is attained an effect that the main storage is constituted with a high-speed memory element and the extended storage includes a low-speed memory element having a large capacity so as to lower the cost of the total system.

We claim:

1. A vector processor having a scalar processing unit and a vector processing unit coupled to a main storage which stores a copy of data stored in logical address spaces of an extended storage, comprising:

first logic means connected to said vector processing unit and said main storage for effecting an address translation in response to an address and an access request issued from the vector processing unit to the main storage, including holding means for storing first information indicating whether or not data of a logical address space exists in said main storage and second information indicating a type of access request issued for data of respective logical address spaces existing in said main storage;

paging processor means, connected to said first logic means and responsive to an access request being issued by said vector processing unit to access a logical address space which first information in said holding means indicates does not exist in the main storage, for interrupting the access request issued from the vector processing unit and for carrying out a relocation algorithm to transfer data including the data of the requested logical address space between the main storage and the extended storage on the basis of second information in said holding means; and second logic means connected to said paging processor means for effecting an address relocation processing associated with logical address spaces of a storage area of the extended storage for access to the extended storage.

2. A vector processor according to claim 1 wherein said paging processor means includes a microprogram to carry out the relocation algorithm.

3. A vector processor according to claim 1 wherein said paging processor means further includes:

loading means for loading the main storage with data existing in a logical address space found in the extended storage;

access monitor means for monitoring an access frequency in the main storage so as to detect an area associated with a lower access frequency; and means operative in response to a result of the detection achieved by said access monitor means for writing data in the area having a lower access frequency from the main storage into the extended storage, and wherein said second logic means includes a relocation table for accessing the extended storage.

4. A vector processor according to claim 3 wherein:

said relocation table for accessing the extended storage is provided in a predetermined area of the main storage;

said paging processor means includes means for issuing a logical address to the extended storage; and the extended storage includes means for effecting a read operation on said predetermined area based on the issued logical address and includes means for translating the logical address into a real address.

5. A vector processor according to claim 1 wherein said first logic means includes a first relocation table for controlling a first address space of the main storage, said first address space being accessible from the scalar processing unit and the vector processing unit; and a second relocation table for controlling a second address space of the main storage, said second address space being accessible from said paging processor means and said vector processing unit.

6. A vector processor according to claim 5, wherein:

said second relocation table includes said holding means having a reference bit section and a change bit section, respectively, disposed in a real space of the main storage; and said paging processor means includes means responsive to information of the reference bit and the change bit read from said second relocation table for controlling a data transfer between the main storage and the extended storage and for rewriting information about the main storage in said second relocation table at the completion of the data transfer.

7. A vector processor according to claim 1 wherein said extended storage comprises.

a multi-virtual space to be managed by an operating system; and a vector access space for which an address specification is established by the operating system such that said paging processor means manages a data transfer between the extended storage and the main storage.

8. A vector processor according to claim 5 wherein said paging processor means includes means responsive to an attempt to access a space to which an access right is not assigned in said vector access space, for interrupting a request related thereto from said scalar processing unit.

9. A vector processor according to claim 1 wherein said vector processing unit comprises address generate means for generating an access request, said address generate means including an address adder for receiving from said paging processor means a processing interrupt request, a release request thereof, and a data address generation request so as to allow a computation of a vector address to be subsequently accessed.

* * * * *